United States Patent Office 3,652,455
Patented Mar. 28, 1972

3,652,455
PROCESS FOR REGENERATING A HYDRATION CATALYST
Herbert Baader, Hermulheim, near Cologne, and Wolfgang Opitz and Armin Jacobowsky, Knapsack, near Cologne, Germany, assignors to Knapsack Aktiengesellschaft, Knapsack, near Cologne, Germany
No Drawing. Filed Apr. 17, 1970, Ser. No. 29,636
Claims priority, application Germany, Apr. 24, 1969,
P 19 20 805.0
Int. Cl. B01j 11/18
U.S. Cl. 252—415                                  4 Claims

ABSTRACT OF THE DISCLOSURE

A catalyst comprising metallic palladium deposited on a silica gel or active carbon carrier for use in the hydration and dechlorination of dichloroacetic acid and/or trichloroacetic acid to produce monochloroacetic acid and/or acetic acid is regenerated. To this effect, the poisoned catalyst is subjected in the hydration zone itself at temperatures of between 50 and 200° C. to treatment with dry chlorine gas until it is saturated, and the hydration zone is exhausted under a pressure of between about 500 and 750 mm. mercury.

---

The present invention relates to a process for regenerating a catalyst for use in the hydration and dechlorination of dichloroacetic acid and/or trichloroacetic acid to obtain monochloroacetic acid and/or acetic acid, the catalyst comprising metallic palladium deposited on a silica gel or active carbon carrier.

The production of monochloroacetic acid from acetic acid and chlorine entails the formation of dichloroacetic acid and trichloroacetic acid by-products. These are dechlorinated in contact with a suitable catalyst and hydrogen to be transformed into monochloroacetic acid and/or acetic acid. The catalysts used to this effect contain between 0.5 and 2 weight percent palladium deposited on a silicic acid or active carbon carrier.

It has already been reported in German specification 910,778 that these catalysts, which are gradually rendered inactive during the hydration, can be regenerated in the catalyst zone itself by treatment with air, at a temperature of between about 200 and 250° C. As described in German specification, 1,072,980, a catalyst so regenerated is, however, rendered inactive after as short an operation period as 14 days by the occurrence of strong resinification. It is further stated therein that the catalyst has been experienced to be accessible only once or twice to regenerating treatment comprising burning off the polymerization products deposited thereon. In the process of this latter specification, the catalyst is but slightly resinified and inactivated. As a result, catalyst regeneration becomes an imperative requirement only after an operation period of about 2 months. To this effect, the temperature prevailing inside the contact furnace is reduced down to about 50° C., however, without arresting the supply of chloroacetic acid in vapor form.

This is a temperature at which the dechlorination fails to proceed with the result that vaporous matter commences to condense on the catalyst surface, the resinification products being washed out by means of the chloroacetic acids. The resins being soluble therein at low temperatures, it is possible to recognize the termination of the regenerating step by the coloration of the solution. The initially dark-colored liquid runs off almost colorless after about 2 to 3 hours. Following this, the temperature is increased and the dechlorination is re-initiated thereby. To have a catalyst fully active in each particular case over the above 2 month period, it is, however, necessary to use pure acetic acid as the feed material. Particularly strong catalyst-poisoning occurs in all those cases in which monochloroacetic acid is produced from less expensive, contaminated acetic acid, e.g. an acetic acid solvent recovered from a further process, or formed by amine acetylation with the use of acetic anhydride. In this event, the catalyst should be regenerated once a week, for continuous operation. While the presence of traces of nitrogen, iodine, sulfur and heavy metal compounds in the product to undergo hydration has been demonstrated by analytic investigations, it has not been possible heretofore to detect the causes that effect catalyst-poisoning.

The present invention now provides a process for regenerating a catalyst for use in the hydration and dechlorination of dichloroacetic acid and/or trichloroacetic acid to produce monochloroacetic acid and/or acetic acid, the catalyst comprising metallic palladium deposited on a silica gel or active carbon carrier, which process comprises subjecting the poisoned catalyst in the hydration zone itself at temperatures of between 50 and 200° C., preferably between 100 and 170° C., to treatment with dry chlorine gas until it is saturated, and exhausting the hydration zone under a pressure of between about 500 and 750 mm. Hg.

The poisoned catalyst should more preferably be saturated with dry chlorine gas over a period of about 1 hour and the hydration zone exhausted simultaneously or successively over a period of between 1 and 2 hours. It is also good practice to scavenge the hydration zone with nitrogen gas, prior to and after the regeneration.

To carry out the catalyst regeneration as disclosed by the present invention, it is necessary to arrest the flow of (a) the mixture to undergo hydration and dechlorination, consisting of acetic acid, mono-, di- and trichloroacetic acids, and (b) hydrogen, to the catalyst. Following this, nitrogen is passed through the catalyst to expel all hydrogen and to avoid the evolution of a chlorine detonating gas during the regeneration, for reasons of security. The scavenging with nitrogen does not affect the economy of the process as this is a precaution that must be taken upon the start up and shutdown of the production facilities. After having been scavenged with nitrogen, the poisoned catalyst still contains some residual acetic acid and chloroacetic acids, but is free from water. The hydration zone is a contact furnace of silver and arranged in upright position. Due to the absence of water, it is impossible for the dry chlorine gas introduced into the hydration zone from below to attack either the silver-lined furnace walls or the metallic palladium in the catalyst; this latter metal remains black during the regeneration. The chlorine is expelled upwardly from the hydration zone, by exhaustion under moderate vacuum. Last residues of chlorine are expelled by the introduction of nitrogen from below. The catalyst so regenerated is found to have regained its initial activity.

The fact that the chlorine gas stream exhausted from the hydration zone contains minor proportions of chloroacetyl chloride and acetyl chloride (which are believed to have been formed by the chlorination of acetic acid and monochloroacetic acid contained in the catalyst, and of which the stability at elevated temperature is dominated by the absence of water) further demonstrates that the regeneration is actually carried out in the absence of water.

Transformation of active reaction centers on the catalyst surface does obviously not occur in the process of the present invention. Catalyst poisons adsorbed on the surface are presumably transformed by the chlorination into readily volatile compounds and expelled during exhaustion. This is an unexpected result bearing in mind that the mixture to undergo hydration comes from the chlorination zone, within which it is sufficiently chlorine-treated. It is likely that the hydration catalyst catalyzes the chlorination of the catalyst poison.

The present invention offers considerable technical advantages over the catalyst regeneration reported in German specification 1,072,980, namely the following:

(1) The regeneration can be carried out at a temperature the same as that used for effecting hydration (e.g. 115° C.) without the need to reduce the temperature in the contact furnace (hydration zone) down to 50° C.

(2) Merely a 1–2 hour period is required to effect regeneration of the catalyst by subjecting it to the chlorination process of the present invention. In clear contrast with this, it takes 3 to 4 hours to cool the hydration zone from 110–140° C. down to 50° C., a further 2 to 3 hours to wash the poisoned catalyst, and again a further 3 to 4 hours to reheat the hydration zone from 50° C. to 110–140° C. In other words, altogether 8 to 11 hours were previously required for the regeneration of 500 liters catalyst.

(3) In the process of the present invention, the catalyst poison is destroyed by the chlorine and exhausted under slightly reduced pressure. For 500 liters catalyst, as little as 2 to 3 kg. organic substance is destroyed per hour; further losses do not occur. In clear contrast with this, German specification 1,072,980 (cf. page 4, lines 4 through 21) decribes that the dissolved catalyst poison is either concentrated through pipelines 16, 17, 1, 2 and 3 in the liquid to undergo dechlorination, or it is required to be removed together with the scrubbing liquid, through pipeline 18.

This, however, implies the loss of the overall quantity of the acid mixture to undergo dechlorination, introduced into the hydration zone within a period of between 2 and 3 hours. This corresponds to an hourly loss of between 200 and 400 kg. for a catalyst quantity of 500 liters.

EXAMPLE

A silver hydration reactor having 500 liters catalyst placed therein (=210 kg. consisting of 207.6 kg. silica gel and 2.4 kg. Pd) was fed at 110 to 140° C. with 280 liters/hr. of a liquid mixture comprising monochloroacetic acid, dichloroacetic acid, trichloroacetic acid and acetic acid, and with 800 cubic meters/hr. hydrogen. The acid mixture contained about 15 weight percent acetic acid, about 45 weight percent monochloroacetic acid, 38 weight percent dichloroacetic acid and 2 weight percent trichloroacetic acid. The mixture was hydrated with the resultant formation of a reaction product which merely consisted of 83 weight percent monochloroacetic acid and 17 weight percent acetic acid. Following an operation period of about 5 days, the product was found to contain dichloroacetic acid in a concentration of 2 percent. After 6 days, it already contained 4 percent and after 7 days 8 percent dichloroacetic acid. The catalyst was found to have been poisoned.

The hydration reactor arranged in upright position was now fed with nitrogen to expel the hydrogen therein and chlorine was introduced from below over a period of about 1 hour, at 100 to 170° C. The chlorine was exhausted upwardly and jointly with volatile chlorination products over a period of up to 2 hours under slightly reduced pressure (750 to 500 mm. Hg). Following this, the chlorine was expelled by means of nitrogen and the reactor was used again for hydration. The catalyst was found to have regained its initial activity and a reaction product free from dichloroacetic acid was obtained.

The catalyst was regenerated a number of times, but its catalytic activity could not be found to have been decreased thereby.

What is claimed is:

1. A process for regenerating a catalyst for use in the hydration and dechlorination of at least one member selected from the group consisting of dichloroacetic acid and trichloroacetic acid to produce at least one member selected from the group consisting of monochloroacetic acid and acetic acid, the catalyst comprising metallic palladium deposited on a silica gel or active carbon carrier, which process comprises subjecting the poisoned catalyst in the hydration zone itself at temperatures of between 50 and 200° C. to treatment with dry chlorine gas until it is saturated, and exhausting the hydration zone under a pressure of between about 500 and 750 mm. mercury.

2. The process as claimed in 1, wherein the poisoned catalyst is saturated with dry chlorine gas over a period of about 1 hour and the hydration zone is exhausted simultaneously or successively over a period of between 1 and 2 hours.

3. The process as claimed in claim 1, wherein the hydration zone is scavenged with nitrogen prior to and after the regeneration.

4. The process as claimed in claim 1, wherein the poisoned catalyst is saturated with dry chlorine gas in the hydration zone itself, at temperatures of between 100 and 170° C.

References Cited

UNITED STATES PATENTS

| | | | |
|---|---|---|---|
| 2,671,803 | 3/1954 | Sennewald et al. | 260—539 A |
| 2,863,917 | 12/1958 | Rucker et al. | 260—539 A |
| 3,071,615 | 1/1963 | Opitz et al. | 252—415 |
| 3,134,732 | 5/1964 | Kearby et al. | 252—415 |

DANIEL E. WYMAN, Primary Examiner

P. E. KONOPKA, Assistant Examiner

U.S. Cl. X.R.

252—413, 416; 260—539 A, 541